United States Patent [19]

Carlberg et al.

[11] Patent Number: 4,860,829
[45] Date of Patent: Aug. 29, 1989

[54] INHIBITION OF RESERVOIR SCALE

[75] Inventors: Bob L. Carlberg; Nicholas O. Wolf; Kenneth W. Pober, all of Ponca City, Okla.; William D. Nash, Orange, Tex.

[73] Assignee: Conoco Inc., Ponca City, Okla.

[21] Appl. No.: 274,543

[22] Filed: Nov. 21, 1988

Related U.S. Application Data

[63] Continuation-in-part of Ser. No. 196,848, May 12, 1988, abandoned, which is a continuation of Ser. No. 74,804, Jul. 17, 1987, abandoned.

[51] Int. Cl.$^4$ .................... E21B 41/02; E21B 43/12
[52] U.S. Cl. .................... 166/279; 166/902; 252/8.552
[58] Field of Search ............... 166/279, 310, 371, 902; 252/8.552

[56] References Cited

U.S. PATENT DOCUMENTS

| | | | |
|---|---|---|---|
| 3,214,454 | 10/1965 | Blaser et al. | 556/18 |
| 3,336,221 | 8/1967 | Ralston et al. | 252/8.552 X |
| 3,481,400 | 12/1969 | Kerver et al. | 166/279 |
| 3,483,925 | 12/1969 | Slyker et al. | 166/279 |
| 3,502,587 | 3/1970 | Stanford et al. | 166/279 X |
| 3,633,672 | 1/1972 | Smith et al. | 166/279 |
| 3,684,720 | 8/1972 | Richardson | 252/8.552 X |
| 3,704,750 | 12/1972 | Miles et al. | 166/279 |
| 4,357,248 | 11/1982 | Berkshire et al. | 166/279 X |
| 4,393,938 | 7/1983 | Lawson et al. | 166/279 |
| 4,779,679 | 10/1988 | Snavely, Jr. et al. | 166/279 |
| 4,787,455 | 11/1988 | Snavely, Jr. et al. | 166/279 |

OTHER PUBLICATIONS

Society of Petroleum Engineers of AIME-"The Chemistry and Design of Scale Inhibitor Squeeze Treatments"-by K. O. Meyers and H. L. Skillman, ARCO Resources Technology-1985.

Primary Examiner—George A. Suchfield

[57] ABSTRACT

Scaling of a production well in a non-carbonate subterranean reservoir is inhibited by injecting into the reservoir a mixture of a phosphonate inhibitor and a metal chelate where the metal chelate has a lower stability constant (Ke) than the phosphonate inhibitor.

17 Claims, No Drawings

INHIBITION OF RESERVOIR SCALE

RELATED APPLICATIONS

This application is a continuation-in-part of copending U.S. Ser. No. 196,848, filed May 12, 1988, now abandoned, which in turn is a continuation of U.S. Ser. No. 074,804, filed July 17, 1987 and now abandoned.

BACKGROUND OF THE INVENTION

1. Field of the Invention

This invention relates to inhibition of scale formation in a producing well, and more particularly to a squeeze inhibition treatment which is effective in inhibiting scale formation in non-carbonate reservoirs.

Relatively low concentrations of water-soluble, organic scale inhibitors are known to reduce the rate of scale formation in and around the bottom of a producing well. Scales are slightly soluble inorganic salts, such as calcium or barium sulfates or calcium carbonate, etc. The mechanism of the inhibition is probably a combination of sequestering or complexing of multivalent cations and an absorption of inhibitor onto solid surfaces such as the rapid growth planes of newly formed crystallites. Although a wide variety of materials inhibit crystal growth, the compounds most commonly used in well treatments are organic phosphates or phosphonates, adducts of acrylic acid or the like. Where supersaturated or scale-forming waters are encountered in an oil production operation, scale inhibitors are commonly injected or "squeezed" into the reservoir formation. The squeezing amounts to injecting the inhibitor, and usually includes overflushing the treated zone with water. The well is then placed back on production and the entrainment of the inhibitor in the produced water protects the wellbore and downhole equipment from scale build-up.

In recent years a procedure called "precipitation squeeze" has been developed. In this process, the scale inhibitor reacts or is reacted to form an insoluble salt which precipitates in the pores of the formation rock. For example, phosphonates can be precipitated as the calcium salt. Other inhibitors such as phosphate esters are not suitable since they do not form insoluble calcium salts. In practice, an acidic solution of a phosphonate is squeezed down a wellbore into a limestone or dolomite-containing reservoir. Here the acid acts on the carbonate to both neutralize the acid and put calcium ions into solution:

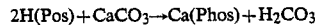

2H(Pos)+CaCO₃→Ca(Phos)+H₂CO₃

With rising pH and increasing a calcium ion concentration, precipitation of calcium phosphonate takes place within the pore spaces of the rock. Following precipitation, the well is returned to production.

Precipitation squeeze treatments have been proven very successful in carbonate reservoirs, generally reaching a longer useful life than with conventional adsorption-type squeezes. However, this technique is not applicable in non-carbonate reservoirs because no useable source of calcium is available downhole. The use of precipitation squeezes in non-carbonate (sand) reservoirs would be expected to provide the same extended life treatment now seen in carbonate reservoirs. To achieve such a squeeze in sandstones, both metal ion and phosphonate must be included in the solution placed in the reservoir.

According to the method of this invention, a mixture of a phosphonate inhibitor and a metal chelate, such as a calcium chelate, are injected down the wellbore and into the non-carbonate reservoir formation. The metal chelate selected has a lower stability constant than the phosphonate inhibitor.

In one aspect of the invention, the type and amount of metal chelate is selected to prevent any precipitation of metal phosphonate formed by the reaction of the metal in the metal chelate with the phosphonate inhibitor until the mixture has been injected into the reservoir.

2. The Prior Art

U.S. Pat. No. 3,633,672 discloses injecting into a formation an inhibitor which forms multivalent cation salts which are only slightly soluble in substantially neutral or alkaline water with both the inhibitor and a compound containing multivalent cations dissolved in an acidic aqueous liquid, so that the relatively insoluble salt of the inhibitor is precipitated when the acid is neutralized within the reservoir.

U.S. Pat. No. 3,704,750 discloses injecting into a formation a strongly acidic solution of a monovalent cation salt of polyacrylic acid or amide and a salt of a multivalent cation, to cause a precipitation of an inhibitor of low solubility when the acid is neutralized within the reservoir.

U.S. Pat. No. 4,357,248 discloses that scaling of a producing well can be inhibited by injecting into the reservoir a self-reacting alkaline aqueous solution of a pH lowering reactant, a compound containing scale-inhibiting anions and a compound containing multivalent cations, which solution subsequently precipitates a slightly soluble scale inhibitor within the reservoir.

U.S. Pat. No. 4,393,938 discloses injecting a scale inhibitor dissolved in an aqueous solution having a pH and ratio of monovalent-to-multivalent cations such that multivalent cationic salts of the inhibitor are precipitated as a result of a cation exchange within the reservoir.

"The chemistry and design of scale inhibitor squeeze treatments", *Society of Petroleum Engineers*, 1985, discusses precipitation squeeze procedures and states that precipitation may result from the limited solubility of inhibitor at reservoir conditions, or from the formation of a low solubility salt such as a calcium phosphonate. It further discloses that the divalent cations needed to precipitate such salts may be naturally abundant in the reservoir brine, cation exchange from the reservoir rock, injected in the formation with the inhibitor or dissolved from the formation.

DESCRIPTION OF THE PREFERRED EMBODIMENTS

A variety of water soluble metal salts may be used to form the metal chelates employed in the process of the invention. They include the salts of such metals as copper, iron, cadmium, cobalt, manganese, zinc, tin, nickel, strontium, barium, magnesium and calcium. Particularly preferred are the salts of calcium and manganese and especially the salts of calcium. Specific salts which may be employed in the process include the metal halides, with the chloride being preferred, and the metal nitrates.

In general, any water soluble metal salt which forms a complex with chelating agents, and where the metal in the metal salts reacts with phosphonates to form insoluble metal phosphonates, as set forth in the following description, may be used in carrying out the process of the invention.

For convenience the process of the invention is described hereinafter with the use of calcium salts.

At concentrations above about 0.1% phosphonate (the actual concentration is dependent on the particular molecular structure), calcium phosphonate precipitates when the molar calcium concentration exceeds the molar phosphonate concentration. In the method of the invention calcium is supplied in sufficient concentration for reaction with the phosphonate and at the same time precipitation is retarded by supplying the calcium in the form of a chelate. The chelates used are prepared in a conventional manner by reacting a calcium salt such as calcium chloride with a water solution of chelating agent. The chelate forms a complex with the calcium ions in the calcium chloride. Any water soluble calcium salt may be used in carrying out the invention. Calcium chloride is preferred because of its availability and low cost. A wide variety of chelating agents may be used for preparing the calcium chelate, including the following:

| Chelating Agent | Log Stability Constant* |
|---|---|
| Nitroacetic Acid | −0.30 |
| Salicylic Acid | 0.55 |
| b-Hydroxy Butryic Acid | 0.60 |
| 4-Sulfoaniline Diacetic Acid | 0.95 |
| Lactic Acid | 1.07 |
| Glycolic Acid | 1.11 |
| Glyceric Acid | 1.18 |
| Gluconic Acid | 1.21 |
| Glyclgycine | 1.24 |
| a-Alanine | 1.24 |
| 3-Sulfoaniline Diacetic Acid | 1.26 |
| 4-Aminobenzoic Acid-N,N—Diacetic Acid | 1.30 |
| Adenosine Phosphate | 1.41 |
| Glycine | 1.43 |
| 3-Aminobenzoic Acid-N,N—Diacetic Acid | 1.46 |
| Serine | 1.48 |
| Tyrosine | 1.48 |
| Aniline Diacetic Acid | 1.50 |
| N—Butylethylenediamine-Triacetic Acid | 1.60 |
| Aspartic Acid | 1.60 |
| Glutamic Acid | 1.60 |
| N—Cyclohexylethylenediamine-Triacetic Acid | 1.70 |
| N,N'—Ethylenebis(2(o-Hydroxyphenyl)) Glycine | 1.70 |
| Tartaric Acid | 1.80 |
| Malic Acid | 1.80 |
| b-(N—Trimethylammonium Ethylimino Diacetic Acid | 1.88 |
| Disodium 1,2-Dihydroxybenzene-3,5-Sulfonate | 2.18 |
| Imino-Diacetic Acid | 2.59 |
| N—Cyanomethylimino-Diacetic Acid | 2.75 |
| Adenosine Di-Phosphate | 2.78 |
| N—Carbethoxy-b-Aminoethylimino-Diacetic Acid | 2.99 |
| Tri-Polyphosphoric Acid | 3.10 |
| Citric Acid | 3.22 |
| N—Methylthioethylimino-Diacetic Acid | 3.34 |
| Tri-Metaphosphoric Acid | 3.48 |
| 8-Hydroxyquinoline-5-Sulfonic Acid | 3.52 |
| Adenosine Tri-Phosphate | 3.60 |
| N—Methyl-Imino-Diacetic Acid | 3.75 |
| N—Acetamidoimino-Diacetic Acid | 3.96 |
| b-Aminoethylsulfonic Acid-N,N—Diacetic Acid | 4.15 |
| 1,4-Diaminocyclohexane-N,N'—Tetracetic Acid | 4.19 |
| N—Methoxyethylimino-Diacetic Acid | 4.53 |
| 2-Sulfoaniline Diacetic Acid | 4.57 |
| Pentamethylenediamine-Tetraacedic Acid | 4.62 |
| N—Hydroxyethylimino-Diacetic Acid | 4.63 |
| Ethylenediamine-N,N—Diacetic Acid | 4.63 |
| 1,3-Diaminocyclohexane-N,N'—Tetraacetic Acid | 4.77 |
| b-Mercaptoethylimino-Diacetic Acid | 4.88 |
| Tetra-Metaphosphoric Acid | 4.89 |
| Nitrilo Propionic Diacetic Acid | 5.04 |

-continued

| Chelating Agent | Log Stability Constant* |
|---|---|
| Tetramethylenediamine-Tetraacetic Acid | 5.05 |
| 2-Aminobenzoic Acid-N,N—Diacetic Acid | 5.06 |
| HDTPA** | 5.20 |
| b-Aminoethylphosphonic Acid-N,N-Diacetic Acid | 5.44 |
| N,N—Dihydroxyethylethylenediamine-Diacetic Acid | 5.70 |
| Ethylenediamine-Tetra(Methylenephosphonic) Acid** | 6.09 |
| Nitrilo Triacetic Acid | 6.41 |
| N—Benzylethylenediamine-Triacetic Acid | 6.70 |
| Trimethylenediamine-Tetraacetic Acid | 7.12 |
| Aminomethylphosphonic Acid-N,N—Diacetic Acid** | 7.18 |
| N—Hydroxyethylethylenediamine-Triacetic Acid | 8.00 |
| Aminobarbituric Acid-N,N—Diacetic Acid | 8.77 |
| Diethylenetriamine-Pentaacetic Acid | 10.11 |
| Ethylene Diamine Tetra Acetic Acid | 10.59 |
| 1,2-Bis(2(Dicarboxymethyl)Aminoethoxy)Ethane | 11.00 |
| 1,2-Diaminocyclohexane-N,N'—Tetraacetic Acid | 12.50 |

*All values of Log Stability Constants listed were measured at a pH of 12-14. The constants would be lower at lower values of pH.
**These materials are phosphonates. Thus two different phosphonates may be used in carrying out the process of the invention. Accordingly, the term "phosphonate" as used herein does not include the chelating agent which is used to form the calcium chelate.

A prerequisite of the chelating agent used is that it have a lower stability constant than the phosphonate. The stability constant is represented by the following equation:

$$Ke = \frac{[ML]}{[M] \times [L]}$$

Ke = Stability Constant
M = Molar concentration of unreacted metal ion (Calcium)
L = Molar concentration of unreacted chelating agent
ML = Molar concentration of metal ion (Calcium) chelate The phosphonate employed in carrying out the invention, which is also a chelating agent, has a higher stability constant than the calcium chelate, and thus, is a stronger chelate. Unreacted metal in the calcium chelate is gradually taken up by the stronger phosphonate to form calcium phosphonate. Since by definition, the stability constant remains fixed in value (at a given pH and temperature), a portion of the calcium chelate must decompose to supply calcium ions which are taken up by the phosphonate. Thus, a continuing source of calcium is available to the phosphonate. When the calcium concentration in the phosphonate exceeds the phosphonate concentration, calcium phosphonate begins to precipitate. This too is a gradual process and precipitation continues as additional calcium is released by the calcium chelate and taken up by the phosphonate. The entire process proceeds at a relatively slow rate so that the phosphonate inhibitor remains in the formation over a substantial period of time.

It is desirable to delay precipitation of the calcium phosphonate until the phosphonate has been squeezed into the formation. By adjusting the pH, the amount of calcium chelated and by selecting chelating agents of varying stability constants, it is possible to control the time between solution mixing and calcium phosphonate precipitation. Effecting the required time delay allows the solution mixture to be displaced into the sand reservoir prior to precipitation.

Usually it is preferred that precipitation commence in not less that 6 to 8 hours and that it be completed in approximately 24 hours so that the well may be returned to production in a timely manner.

A wide variety of phosphonates may be used in carrying out the invention. Suitable inhibitors include nitrogen containing phosphonate compounds such as the salts of nitrilotri(methylene phosphonic acid) or diethylenetriaminepenta (methylene phosphonic acid). The acids or their salts are available from Monsanto Chemical Co. under the trade names DEQUEST 2000 and DEQUEST 2060. Other phosphonic acids or salts available from Monsanto include ethylenediamenetetra (methylene phosphonic acid) (DEQUEST 2041) and sodium aminotri (methylene phosphonic acid) (DEQUEST 2006). All of the above phosphonic acids or salts contain nitrogen. However, other DEQUEST materials which do not are also available, and are also suitable in carrying out the process of the invention.

Other organic phosphonate inhibitors (disclosed in U.S. Pat. No. 3,483,925) which may be used are salts of either:

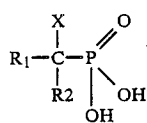

(a)

where $R_1$ is selected from the group consisting of H, alkyl groups up to four carbon atoms, phenyl, and phosphonic acid groups, $R_2$ is selected from the group consisting of hydrogen, alkyl groups having up to 4 carbon atoms and

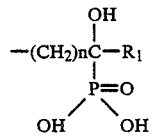

where n is an integer from 0 to 8, and X is H or OH, or

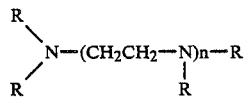

(b)

wherein R is selected from the group consisting of hydrogen and

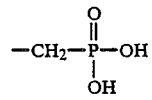

provided, however, that at least half of the radicals represented by R are

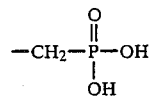

and n is an integer from 0 to 14. A specific example of (b) is the sodium salt of amino trimethylene phosphonate.

Still other phosphonates which may be employed are the salts of polyalkalene polyamino polykis methylene phosphonic acids, which are disclosed in U.S. Pat. No. 3,619,427.

Additional organic phosphonates are disclosed in U.S. Pat. Nos. 3,214,454 and 3,336,221.

The phosphonates are used in the form of a salt and must be soluble in the aqueous carrier liquid in which they are introduced to the formation. Usually the sodium, potassium or ammonium salts are employed. The aqueous carrier liquid is preferably water, although, brines may also be used. The phosphonate concentration in the carrier liquid is usually between about 2 and about 15 weight percent active phosphonate and preferably between about 2 and about 5 percent. The amount of phosphonate used may vary widely. Usually the volume of carrier liquid is equal to not less than about 0.2% of one days water production from the formation. Since the amount of water produced in a given formation may vary widely, the amount of carrier liquid may be substantially greater than 0.2 volume percent, particularly with lower amounts of water production. The rate of introduction of phosphonate solution to the formation may be varied substantially. However, the rate must be kept low enough not to exceed the parting pressure of the formation.

The amount of calcium chelate in the phosphonate solution may vary depending on the stability constants of the phosphonate and the calcium chelate or chelates employed. Usually, the amount of calcium chelate is between about 1 and about 3 moles per mole of phosphonate.

The following examples illustrate the results obtained in carrying out the invention:

EXAMPLE 1

Two chelate solutions in water were prepared using Dequest 2006 (pentasodium salt of aminotri-(methylene phosphonic acid) in one solution and sodium citrate or nitrilotriacetic acid (NTA) in the other solution. Calcium chloride sufficient to satisfy the chelation requirements of the Dequest was provided in the solution containing the citrate or NTA. When the solutions were mixed turbidity was measured at regular intervals as an indication of reaction rates. A turbidity of 20 NTU (Nephelometric Turbidity Units) was defined as the onset of precipitation.

The results of the tests are presented in Table 1.

TABLE 1

| Run No. | Temp. °F. | D-2006 Solution | | Citrate or NTA Solution | | | | Time to 20 NTU hr:min |
|---|---|---|---|---|---|---|---|---|
| | | Water-gm | D-2006-gm | Water-gm | Citrate-gm | NTA-gm | CaCl$_2$-gm | |
| 1 | 72 | 9 | 1 | 10 | 0.440 | — | 0.200 | 14.11 |
| 2 | 72 | 9 | 1 | 10 | 0.460 | — | 0.210 | 3:17 |
| 3 | 72 | 9 | 1 | 10 | 0.390 | — | 0.190 | 8:03 |
| 4 | 72 | 9 | 1 | 10 | 0.400 | — | 0.190 | 12:43 |
| 5 | 72 | 9 | 1 | 10 | 0.410 | — | 0.190 | 16:11 |
| 6* | 72 | 9 | 1 | 10 | — | 0.240 | 0.200 | 9:33 |

TABLE 1-continued

| Run No. | Temp. °F. | D-2006 Solution | | Citrate or NTA Solution | | | | Time to 20 NTU hr:min |
|---|---|---|---|---|---|---|---|---|
| | | Water-gm | D-2006-gm | Water-gm | Citrate-gm | NTA-gm | CaCl$_2$-gm | |
| 7* | 72 | 9 | 1 | 10 | — | 0.240 | 0.200 | 81:20 |
| 8* | 72 | 9 | 1 | 10 | — | 0.240 | 0.200 | 104:72 |
| 9 | 86 | 9 | 1 | 10 | — | 0.270 | 0.200 | 2:43 |
| 10 | 86 | 9 | 1 | 10 | — | 0.310 | 0.210 | 5:21 |
| 11 | 86 | 9 | 1 | 10 | — | 0.400 | 0.250 | 25:38 |

*The pH of the mixed solutions was 7.0 except in runs 6, 7 & 8 where it was adjusted to 7.2, 7.4, and 7.6 respectively.

EXAMPLE 2

A field test was carried out in a sandstone reservoir currently producing about 1 barrel of oil and about 1 barrel of water per day, using the following procedure:

(1) In one tank 500 gallons of fresh water was mixed with 435 pounds of Dequest 2006.

(2) In a second tank 500 gallons of 2% KCl was mixed with 150 pounds of nitrilotriacetic acid sodium salt. Concentrated HCl was added to reduce the pH to about 4, after which 85 pounds of 92% active CaCl2 pellets was added.

(3) The two tanks were pumped together while adding NaOH to maintain the pH of the mixture at 7.

(4) After mixing the mixed chelate solution was pumped down the annulus of the well at a rate of 2 barrels per minute.

(5) Following injection of the solution the well was flushed with 135 barrels of 2 percent KCl solution to displace the mixed chelate solution approximately 8 feet away from the well bore.

(6) The well was shut in for about 20 hours before being returned to production.

(7) The results obtained over a 166 day time period are presented in Table 2.

TABLE 2

| Days | Water Produced Liters/day | Phosphonate in Water-Mg/liter | Phosphonate Produced-Gr. |
|---|---|---|---|
| 0–8 | 2000 | 0.00 | 0.00000 |
| 8–9 | 2000 | 54.00 | 108.00000 |
| 9–10 | 2000 | 28.00 | 56.00000 |
| 10–18 | 2000 | 13.00 | 208.00000 |
| 18–24 | 2000 | 18.00 | 216.00000 |
| 24–26 | 2000 | 33.01 | 132.00000 |
| 26–31 | 207 | 838.00 | 867.33000 |
| 31–38 | 207 | 12.00 | 17.38800 |
| 38–45 | 207 | 16.00 | 23.18400 |
| 45–52 | 207 | 12.00 | 17.38800 |
| 52–55 | 207 | 13.01 | 8.07921 |
| 55–60 | 175 | 14.00 | 12.25000 |
| 60–66 | 175 | 0.70 | 0.73500 |
| 66–73 | 175 | 0.60 | 0.73500 |
| 73–80 | 175 | 0.80 | 0.98000 |
| 80–85 | 175 | 0.51 | 0.44625 |
| 85–87 | 159 | 0.20 | 0.06360 |
| 87–101 | 159 | 0.20 | 0.44520 |
| 101–108 | 159 | 21.00 | 23.37300 |
| 108–115 | 159 | 24.00 | 26.71200 |
| 115–122 | 159 | 27.00 | 30.05100 |
| 122–129 | 159 | 23.00 | 25.59900 |
| 129–136 | 159 | 24.00 | 26.71200 |
| 136–143 | 159 | 33.00 | 36.72900 |
| 143–150 | 159 | 82.20 | 91.48860 |
| 150–157 | 159 | 42.90 | 47.74770 |
| 157–166 | 159 | 39.00 | 55.80900 |

Although the amount varies, it is noted that phosphonate is present in all of the produced water starting with the eighth day of the test. In addition, a large amount of phosphonate remained in the formation for future production and protection against scaling.

I claim:

1. A treating process for inhibiting scaling by fluid which is produced from a non-carbonate subterranean reservoir via a wellbore which comprises injecting down the wellbore and into the reservoir a mixture of a phosphonate scale inhibiting compound and a calcium chelate where the calcium chelate has a lower stability constant (Ke) than the phosphonate inhibitor.

2. The process of claim 1 in which the type and amount of calcium chelate is selected to prevent precipitation of calcium phosphonate formed by the reaction of calcium in the calcium chelate with the phosphonate inhibitor until the mixture has been injected into the reservoir.

3. The process of claim 2 in which precipitation is delayed for up to 24 hours after preparation of the mixture of phosphonate and calcium chelate.

4. A treating process for inhibiting scaling by fluid which is produced from a non-carbonate subterranean reservoir via a wellbore which comprises reacting a chelating agent with a calcium salt to form a calcium chelate, mixing the calcium chelate with a phosphonate scale inhibiting compound, where the calcium chelate has a lower stability constant (Ke) than the phosphonate inhibitor, forming a solution of the mixture in an aqueous carrier liquid and injecting the solution down the wellbore and into the subterranean reservoir.

5. The process of claim 4 in which the type and amount of calcium chelate is selected to prevent precipitation of calcium phosphonate formed by the reaction of calcium in the calcium chelate with the phosphonate inhibitor until the mixture has been injected into the reservoir.

6. The process of claim 5 in which precipitation is delayed for up to 24 hours after preparation of the mixture of phosphonate and calcium chelate.

7. The process of claim 6 in which the volume of carrier liquid is at least 0.2% of the volume of fluid produced from the reservoir in 24 hours.

8. The process of claim 7 in which the concentration of active phosphonate inhibitor in the solution is between about 2 and about 5 percent.

9. The process of claim 7 in which the phosphonate inhibitor is a nitrogen containing phosphonate.

10. The process of claim 8 in which the phosphonate inhibitor is a non-nitrogen containing phosphonate.

11. A treating process for inhibiting scaling by fluid which is produced from a non-carbonate subterranean reservoir via a wellbore which comprises injecting down the wellbore and into the reservoir a mixture of a phosphonate scale inhibiting compound and a metal chelate where the metal chelate has a lower stability constant (Ke) than the phosphonate inhibitor and where the metal in the metal chelate forms an insoluble salt upon reaction with the phosphonate.

12. The process of claim 11 in which the type and amount of metal chelate is selected to prevent precipitation of metal phosphonate formed by the reaction of metal in the metal chelate with the phosphonate inhibitor until the mixture has been injected into the reservoir.

13. The process of claim 12 in which the metal in the metal chelate is selected from the group consisting of copper, iron, cadmium, cobalt, manganese, zinc, tin, nickel, strontium, barium, magnesium and calcium.

14. A treating process for inhibiting scaling by fluid which is produced from a non-carbonate subterranean reservoir via a wellbore which comprises reacting a chelating agent with a water soluble metal salt to form a metal chelate, mixing the metal chelate with a phosphonate scale inhibiting compound, where the metal chelate has a lower stability constant (Ke) than the phosphonate inhibitor and where the metal in the metal chelate forms an insoluble salt upon reaction with the phosphonate, forming a solution of the mixture in an aqueous carrier liquid and injecting the solution down the wellbore and into the subterranean reservoir.

15. The process of claim 14 in which the type and amount of metal chelate is selected to prevent precipitation of metal phosphonate formed by the reaction of metal in the metal chelate with the phosphonate inhibitor until the mixture has been injected into the reservoir.

16. The process of claim 15 in which the metal in the metal chelate is selected from the group consisting of copper, iron, cadmium, cobalt, manganese, zinc, tin, nickel, strontium, barium, magnesium and calcium.

17. The process of claim 16 in which the concentration of active phosphonate inhibitor in the solution is between about 2 and about 15 weight percent.

* * * * *